United States Patent

[11] 3,622,957

| [72] | Inventors | Ronald S. Libengood<br>Monroeville;<br>Frederick G. Geil, Pittsburgh, both of Pa. |
|---|---|---|
| [21] | Appl. No. | 5,637 |
| [22] | Filed | Jan. 26, 1970 |
| [45] | Patented | Nov. 23, 1971 |
| [73] | Assignee | Westinghouse Electric Corporation<br>Pittsburgh, Pa. |

[54] ULTRASONIC OBJECT DETECTOR
11 Claims, 2 Drawing Figs.

[52] U.S. Cl................................................ 340/1 R,
343/7.3
[51] Int. Cl.................................................... G01s 9/68
[50] Field of Search.......................................... 340/1, 1 C,
1 T, 3; 343/7.3, 7.5

[56] References Cited
UNITED STATES PATENTS

| 3,209,313 | 9/1965 | Auer, Jr. et al. .............. | 340/1 |
| 3,500,302 | 3/1970 | Moss, Jr. et al. .............. | 340/3 |

Primary Examiner—Richard A. Farley
Attorneys—F. H. Henson, C. F. Renz and M. P. Lynch

ABSTRACT: An ultrasonic object detector system operating on the echo-ranging principle and including circuit adjustments which render the object detector system responsive to objects at a preselected distance. Additional circuit adjustments provide control of the depth of field sensitivity of the object detector system relative to the selected object distance as well as providing the capability of "locking-in" the object to prevent loss of object recognition.

ULTRASONIC OBJECT DETECTOR

BACKGROUND OF THE INVENTION

Numerous types of noncontact object detectors are available including the ultrasonic type of object detector. The ultrasonic object detector is preferred in most applications since it responds equally well to opaque, transparent, liquid and solid objects without being adversely affected by ambient light conditions, dust, smoke, humidity or electromagnetic fields.

The conventional ultrasonic object detector employs spaced-apart transmitters and receivers and operate on an interrupted-beam principle, i.e., an object is sensed when the acoustic beam transmitted between the transmitter and receiver is interrupted.

This type of operation requires critical alignment of the transmitter and receiver with respect to the object. The interrupted-beam mode of operation does not provide recognition of selected objects located in the sensing path defined by the acoustic beam but rather provides merely a "yes-no," "true-false" type of response.

SUMMARY OF THE INVENTION

The invention comprises an ultrasonic object detector system incorporating a transmitter and receiver at a common location thus eliminating the critical alignment problems encountered in the conventional object detector systems. This novel object detector operates on the echo-ranging principle rather than the conventional interrupted-beam principle. The echo-ranging mode of operation enables the object detector to measure the distance between the detector and the object and produce an object recognition indication when the object is at a preselected distance.

The distance from the object detector system and the object is determined by measuring the elapsed time between the transmission of an acoustic signal from the object detector system and the received echo from the object. This measured time interval is compared to an internally developed signal calibrated to represent a preselected object distance. If the object distance from the detector system, as represented by the received echo signal, is coincident with the preselected object distance established within the detector system, an object detection indication is given. A depth of field control, which is independent of the object detector distance control, is provided to establish a reference time interval in units of distance relative to the selected object distance so as to render the object detector responsive to an object appearing in the predetermined area. The combined effect of the object detector control and the depth of field control within the object detector system establishes a reference signal. The occurrence of a reflected acoustic signal in time coincidence with the reference pulse results in a detector system object recognition output signal.

An object lock circuit extends the reference signal limits subsequent to the detection indication so as to provide stable object detector operation which is substantially unaffected by transmitted signal time variations resulting from air currents, object vibration, etc.

The unique operation of this object detector system not only fulfills the requirements of routine applications such as counting and sorting, but also permits the use of the object detector system for applications where indication of a particular distance between the sensor and an object must be given. Examples of the latter application include intruder alarm systems, vehicular brake actuator systems, etc.

DESCRIPTION OF THE PREFERRED EMBODIMENT

Figure 1:
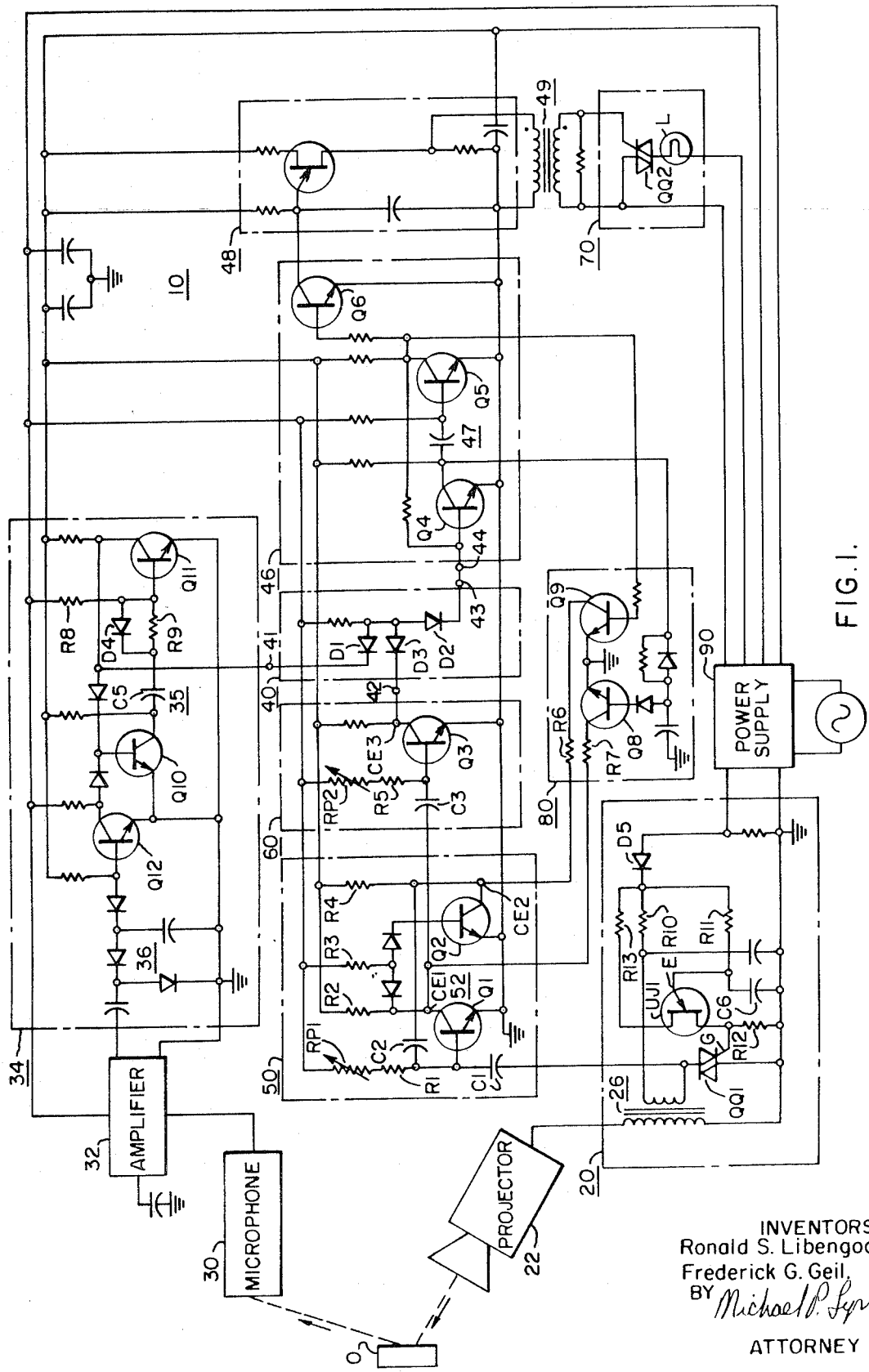
FIG. 1 is a schematic diagram of an embodiment of the invention.

Referring to FIG. 1, there is illustrated schematically an object detector system 10 comprising an ultrasonic transmitter circuit 20, a transmitting transducer 22, i.e. a projector, which directs ultrasonic acoustic pulses towards a remote object 0 in the form of an acoustic beam, an ultrasonic receiving transducer 30, i.e. a microphone, which responds to ultrasonic pulses reflected by the object 0 and converts the ultrasonic pulses into an electrical pulse signal which is transmitted to a coincidence circuit 40. Coincidence circuit 40 generates an output signal upon recognition of reflected ultrasonic pulses which correspond in time to a pulse signal indicative of a preselected object distance established by a distance selector circuit 50. The distance of the object from the object detector system is determined by measuring the time interval between the transmission of the acoustic pulses and the received echo or reflection from the object 0. While the object distance pulse signal is of finite duration and thus provides an interval of time or distance within which the circuit 10 is sensitive, additional scrutiny of the detected object is provided by a depth of field control circuit 60 which functions independently of the distance selector control circuit 50 to render the object detector system 10 sensitive to objects appearing within preselected distance limits relative to the preselected object distance. The combined effects of circuits 50 and 60 establish a reference pulse signal. The output signal of the coincidence circuit 40 resulting from recognition of an object within the limits of the reference pulse signal activates both an output control circuit 70 and an object lock circuit 80. The object lock circuit 80 responds to the coincidence circuit 40 output signal by adjusting the limits of the reference signal established by the circuits 50 and 60 to prevent loss of the object recognition. The detector circuit 10 is sensitive to objects travelling either parallel to the axis of the acoustic beam or perpendicular to the acoustic beam.

A constant voltage source 90 supplies excitation and bias potential to the object detector system 10. A 60-Hertz AC input voltage signal is applied to the transmitter 20 by the voltage source 90. This line frequency input voltage signal results in the development of pulses at a repetition rate of 60 pulses per second by a gate-controlled conduction device QQ1, commonly referred to as a Triac. The pulses developed by the control conduction device QQ1 are coupled to the transmitting transducer 22 by a transformer 26 and the transducer 22 responds by oscillating at its resonant frequency and producing and acoustic pulse output in the ultrasonic region. The acoustic pulses thus developed are directed toward the object 0 in the form of an acoustic beam.

The particular application will determine the size of acoustic beam required. In many applications a relatively broad beam is acceptable in which case an inexpensive transmitting transducer can be used. If a discrete acoustic beam is required a beam-focusing device can be incorporated, such as a conical horn, or a more expensive transducer can be employed which inherently develops a narrow beam.

Upon contacting the object 0 a portion of the acoustic beam is reflected back to the receiving transducer 30 which converts the acoustic pulses into electrical pulses of the same frequency. The electrical pulses are amplified by an amplifier 32 and applied to a pulse discriminator circuit 34 which converts the pulses into fixed-duration, rectangular pulses which are subsequently supplied as one input to the coincidence circuit 40.

The coincidence circuit 40 comprises a two-input logic AND gate consisting of diodes D1, D2 and D3. The output pulses from the pulse discriminator circuit 34 are applied to input terminal 41 of the coincidence circuit 40. The second input to the coincidence circuit 40, which is applied to the input terminal 42, is developed by the combined but independent action of the distance selector control circuit 50 and the depth of field control circuit 60 in response to the transmitter pulses developed by the conduction control device 24 of the transmitter circuit 20.

The distance selector control circuit 50 includes a monostable circuit 52 comprising transistors Q1 and Q2, as well as capacitors C1 and C2, resistors R1, R2, R3 and R4 and a resistance potentiometer RP1. A transmitter electrical pulse from the conduction control device QQ1 is coupled through the capacitor C1 to trigger the monostable circuit 52 into the unstable state in which transistor Q1 is turned "OFF" and transistor Q2 is turned "ON." The period of time in which the monostable circuit 52 is maintained in the unstable state is controlled by the resistance potentiometer RP1. The resistance potentiometer RP1, resistor R1, and transistor Q1 represent the charging circuit path for capacitor C2. An increase in the resistance value of RP1 results in a decrease in the available charging current for capacitor C2, thereby extending the time required to charge the capacitor C2 and consequently the period of time within which the monostable circuit is retained in the unstable state.

Inasmuch as the speed of travel of acoustic signals through a media can be calculated, i.e., in air it is approximately 1,080 feet per second, the period of time during which the monostable circuit 52 is retained in the unstable state can be calibrated in units of distance, i.e., inches, feet, etc. Furthermore, it is apparent that the resistance potentiometer RP1, which controls the duration of the unstable state of circuit 52, can be calibrated in terms of distance. The adjustment of the resistance potentiometer RP1 establishes the object distance sensitivity of the object detector circuit 10 such that the time duration of the unstable state of the monostable circuit 52 is directly proportional to the desired object distance sensitivity of the object detector circuit 10. For example, a preselected object distance sensitivity of 4 feet would require a resistance potentiometer RP1 setting corresponding to 8 feet to allow the acoustic signal to travel 4 feet to the object and return the 4 feet to the receiving transducer 30.

The depth of field sensitivity of the circuit 10, i.e., the distance interval extending from the selected object distance within which the object detector circuit is sensitive, is established by the depth of field control circuit 60. Depth of field control circuit 60 includes transistor Q3, capacitor C3, resistor R5 and resistance potentiometer RP2.

In operation, when the transmitter circuit 20 output pulse is coupled through capacitor C1 to transistor Q1, the monostable circuit 52 is triggered into its unstable state with Q1 turned OFF and Q2 turned ON as described above. The condition of transistor Q3, which is ON prior to the occurrence of a transmitter circuit 20 output pulse, remains ON during the unstable period of the monostable circuit 52. During this unstable period, the coupling capacitor C3 is quickly charged through resistor R2. This charged condition of the capacitor C3 is maintained while the monostable circuit 52 is in the unstable state. When the charge on capacitor C2 builds up to a level sufficient to trigger monostable circuit 52 to the stable state thus turning transistor Q1 ON, the polarity of charge on the capacitor C3 causes the transistor Q3 to turn OFF. This polarity results in a discharge of the capacitor C3 which produces a positive voltage plus at the collector electrode CE3 of the transistor Q3. The collector electrode CE3 of the transistor Q3 is connected to the input terminal 42 of the coincidence circuit 40 and the positive voltage pulse developed at the collector electrode CE3 represents the second input signal to the coincidence circuit 40.

While the triggering of the monostable circuit 52 from the unstable state to the stable state establishes the distance sensitivity of the detector circuit 10, the duration of the pulse developed at the input terminal 42 of the coincidence circuit 40 by discharging capacitor C3 determines the depth of field sensitivity of the detector circuit 10 relative to the selected distance sensitivity. The duration of the pulse as developed by capacitor C3 and consequently the depth of field limits are controlled by resistance potentiometer RP2 which controls the discharge rate of the capacitor C3. The pulse applied to the input 42 of coincidence circuit 40 thus represents a composite reference signal comprised of the independently selected object distance and the object depth of field provided by the distance selector control circuit 50 and the depth of field control circuit 60.

The reflected pulse signal applied to the input terminal 41 of the coincidence circuit 40 is coupled through diode D1 to diode D2 while the reference pulse applied to the input terminal 42 is coupled to diode D2 by diode D3.

If the pulse information applied to input terminals 41 and 42 exist concurrently, the diode D2 will be forward biased. The forward-biased condition of the diode D2 results in an output pulse at the output terminal 43 of the coincidence circuit 40 which is applied to the input terminal 44 of an output driver circuit 46. The output driver circuit 46, which includes transistors Q4 and Q5, forming a monostable circuit 47, and a transistor Q6 functions to supply an activation signal to the output control circuit 70 and a trigger signal to the object lock circuit 80. The output driver circuit 46 controls the duration of the actuation of the output control circuit 70, which is coupled to circuit 47 by an oscillator circuit 48 and a transformer 49, through the operation of the monostable circuit 47. The presence of an input signal at the input terminal 44 of the circuit 46 causes the transistor Q4 to turn ON and the transistor Q5 to turn OFF. The OFF condition of the transistor Q5 results in the triggering ON of the transistor Q6. This condition remains until capacitor C4 acquires a charge sufficient to return the monostable circuit 47 to the stabe state in which the transistor Q4 is OFF and Q5 is ON.

The output control circuit 70 is illustrated as including a bidirectional solid-state switching device QQ2 and a lamp L. The actuation of the switching device QQ2 by the output of the driver control circuit 46 results in the energization of the lamp L as an indication of an object present at the selected object distance and within the selected depth of field.

The object lock circuit 80, which includes transistors Q8 and Q9 responds to an object detect output signal from the coincidence circuit 40 by expanding the limits of the reference pulse to insure reliable, stable detection of an object. This is accomplished by decreasing the selected object distance which represents the leading edge or limit of the reference pulse and increasing the selected depth of field signal which establishes the trailing edge or limit of the reference pulse. The shifting of the trailing edge of the reference pulse is both to compensate for the shift of the leading edge as well as to expand the depth of field sensitivity beyond the original limit. While the circuit 10 operation has been described as including both object distance and depth of field control, it is apparent that either the object distance selection or depth of field selection could be essentially eliminated, i.e. in some applications a reference signal consisting solely of a pulse corresponding to a preselected object distance may be sufficient. In this latter instance the object lock circuit 80 would function adjust discrete limits of the object distance pulse.

Figure 2:
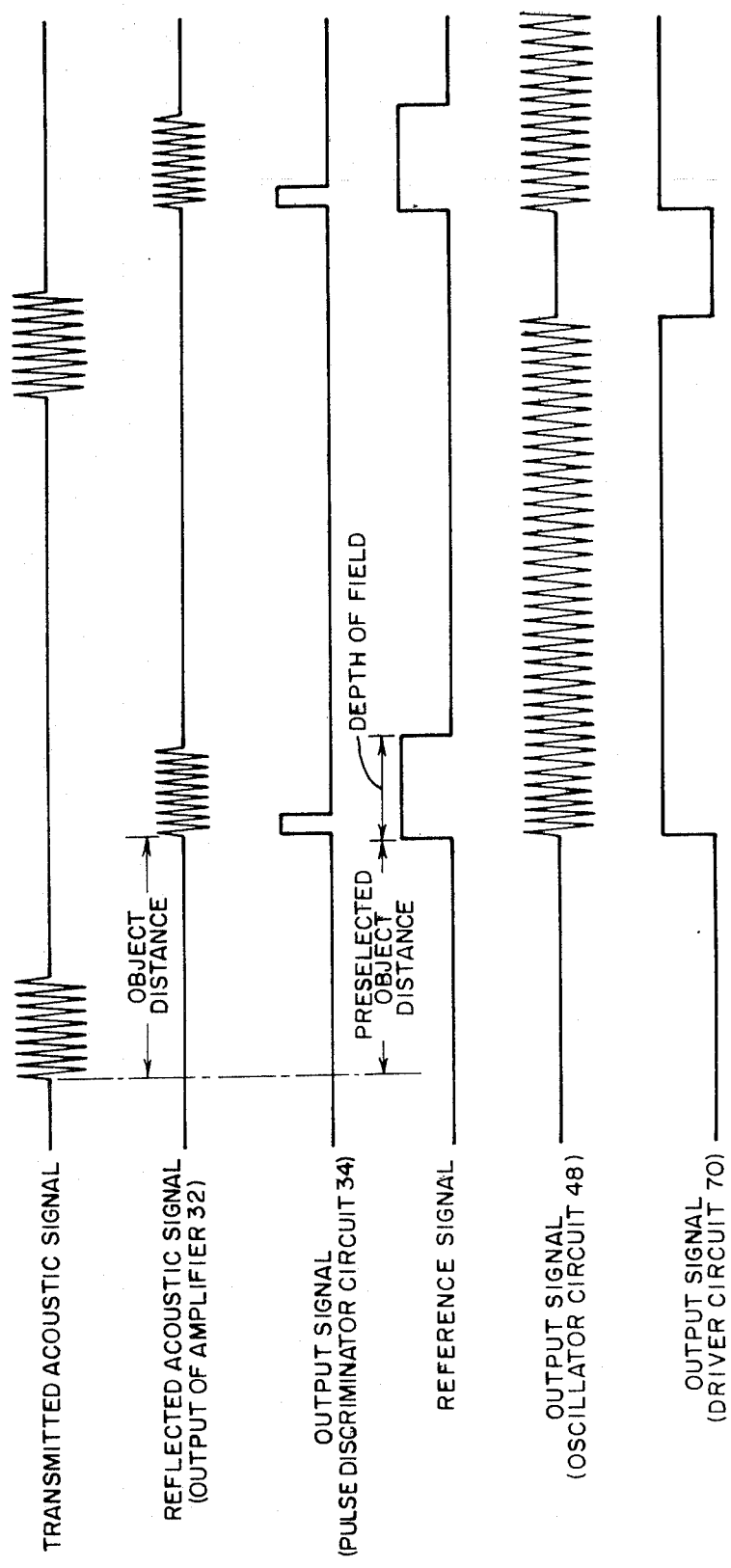
FIG. 2 is a timing diagram illustrating the operation of the embodiment of FIG. 1.

The circuitry of the object lock circuit 80 which is associated with the transistor Q8 is responsible for shifting the leading edge of the reference pulse whereas the circuitry associated with the transistor Q9 is responsible for shifting the trailing edge. When object detection occurs as evidenced by an output signal from the coincidence circuit 40 transistors Q4 and Q5 of the driver output circuit 46 are turned ON and OFF respectively. The triggering of the monostable circuit 46 likewise triggers transistor Q8 to an ON condition. With Q8 in an ON condition, a resistor R6 provides a loading effect on the collector electrode CE2 of the transistor Q2 of the object distance control circuit 50 such that the capacitor C2 does not acquire a charge equal to the full supply voltage. Therefore, the time required to charge the capacitor C2 is now less than that required in normal operation. Inasmuch as the object distance setting is directly proportional to the charging time of the capacitor C2, it is apparent that the reduction of charging time will reduce the object distance sensitivity of the object detector circuit 10 causing a shift in the leading edge of the reference pulse to the left as indicated in FIG. 2. The extent of this shift is a function of the value of resistor R6 and the preset object distance. If the preset object distance is small the shift will be small and vice versa.

The shift of the trailing edge of the reference pulse is the result of the loading of the collector electrode CE1 of the transistor Q1 by resistor R7. Under normal conditions following the coupling of a transmitter output pulse to the distance control circuit 50, the transistor Q4 is OFF and transistor Q8 is ON and the loading of the collector electrode CE1 by the resistor R7 limits the charging of the capacitor C3 to a value less than the full supply voltage. When object detection occurs as evidenced by an output pulse from the coincidence circuit 40, the transistor Q4 turns ON, transistor Q8 turns OFF and the capacitor C3 is permitted to charge to the full supply voltage value. Therefore, the time required to recharge capacitor C3 in the reverse direction following the expiration of the unstable state of the monostable circuit 52 is increased and as a result the output pulse or reference pulse from the coincidence circuit 40 is expanded.

The pulse discriminator circuit 34 includes a monostable circuit 35 comprising transistors Q10 and Q11, a capacitor C5, diode D4, switching transistor Q12, resistors R8 and R9, and a voltage doubler-rectifier circuit 36. Circuit 34 provides a threshold voltage level for the received signal and a discriminatory operation which renders the object detector circuit 10 nonresponsive to a received signal composed of multiple reflections of the same acoustic pulse. In the event extraneous signals are developed which fail to equal or exceed a threshold limit established by the voltage doubler-rectifier circuit 36 is no output signal developed by the pulse discriminator circuit 34. The monostable circuit 35 is responsive to the switching action of transistors Q12 which is maintained in the ON condition when the output of the amplifier 32 is zero or below the threshold level established by the voltage doubler-rectifier circuit 36. When the AC output signal from the amplifier circuit 32 results in a rectified signal input to transistors Q12 which exceeds the threshold level magnitude, the transistor Q12 is turned OFF and the monostable circuit 35 responds by developing a pulse discriminator output pulse.

Furthermore, in the event a portion of the acoustic pulse is reflected back to the transmitter from the object 0 returned to the object and subsequently received by the receiving transducer 30, the pulse discrimination circuit 34 will reject the second occurrence of the same acoustic pulse. This is significant in that without such a safeguard, a twice-reflected acoustic pulse from an object at half the selected object distance could be falsely interpreted as an object at the selected object distance.

In operation the first-reflected acoustic signal of sufficient magnitude to switch transistor Q12 results in a triggering of the monostable circuit 35 to the unstable state with transistor Q10 turning ON, transistor Q11 turning OFF and an output pulse being supplied to the input 41 of the coincident circuit 40. The capacitor C4 charges to a peak voltage through diode D4 and resistor R8. As in the operation of the other monostable circuits, when the capacitor C4 achieves the peak charge the monostable circuit is returned to the stable state with transistor Q10 turning OFF and transistor Q11 turning ON thereby terminating the output pulse. However, instead of providing a rapid restoration of capacitor C4 to its original state, a resistor R9 is connected in series to prolong the restoration of capacitor C4 over a period of time approximately equal to the pulse rate cycle established by the transmitter 20. In so doing the monostable circuit 35 and consequently the object detector circuit 10 is nonresponsive to multiple reflections of the same acoustic signal.

The transmitter circuit 20 represents a simple inexpensive and yet extremely reliable converter circuit for generating output pulses as a function of the magnitude and frequency and AC input signal. The transmitter circuit 20 is illustrated as responding to a 60 Hz. input voltage signal from the power supply 90.

In addition to the gate-controlled conductor device QQ1 and transformer 26, the transmitter circuit includes diode D5, resistors R10, R11, R12 and R13, capacitors C6 and C7, and unijunction transistor UJ1. The positive half cycles of the AC input voltage conducted by the diode D5 are supplied to the gate-controlled conduction device QQ1 through resistor R10 and to the emitter electrode E of the unijunction transistor UJ1 through resistor R11. Resistor R11 and R12 form a voltage divider network and in conjection with capacitor C6 control the emitter voltage of the unijunction transistor UJ1 to delay the firing of the unijunction transistor UJ1 until a prescribed time of the AC input voltage half cycle. When unijunction transistors UJ1 is triggered ON capacitor C6 discharges through the emitter electrode E and the resistor R12 causing a voltage pulse to be applied to the gate electrode 6 of the gate-controlled conduction device QQ1. This gate signal results in the firing of QQ1 and the development of a pulse which is coupled through the transformers 26 to the transmitting transducer 22. The firing of the unijunction transistor UJ1 in coincidence with the peak of the AC input signal produces a transmitter circuit 20 output pulse of optimum magnitude. The unijunction transistor UJ1 having been turned ON, remains ON for the duration of the AC half cycle thereby preventing a charge buildup on the capacitor C6 which could result in development of more than one circuit 20 output pulse per half cycle of the input voltage signal. The controlled firing of the unijunction transistors UJ1 provides compensation for variations in the input voltage frequency. The selection of the frequency of the AC input voltage signal to circuit 20 is in part dependent on the desired distance sensitivity of the detector circuit 10.

The timing diagram of FIG. 2 illustrates the operational relationship of the various circuits of the detector circuit 10. The conversion of the pulse output of the driver circuit 70 into a plurality of oscillator circuit 48 output pulses improves the duration of conduction of the controlled conduction device QQ2 and the duty cycle of the load lamp L. Transient interference is likewise minimized by the operation of the oscillator circuit 48.

What we claim is:

1. Apparatus for ultrasonically detecting an object, comprising, a transmitter circuit means for generating output acoustic pulses in the form of an acoustic beam, a receiver circuit means for responding to the acoustic beam reflected by the object by generating an output electrical pulse signal, an adjustable object distance selector circuit means operatively connected to said transmitter circuit means and responding to the generation of pulses by said transmitter circuit means by generating a reference electrical pulse signal indicative of a preselected object distance, a coincident circuit means having first and second inputs and an output, said first input being operatively connected to said receiver circuit means with the output electrical pulse signal of said receiver circuit means supplied to the first input of said coincident circuit means, said second input being operatively connected to said adjustable object distance selector circuit means with the reference electrical pulse signal developed by said adjustable object distance selector circuit means supplied to the second input of said coincidence circuit means, said coincidence circuit means producing an output electrical pulse signal indicative of recognition of the object at the preselected object distance when the electrical signals are present coincidentally at the first and second inputs of said coincidence circuit means, an adjustable depth of field control circuit means operatively connected to said second input of said coincidence circuit means to expand the reference electrical pulse signal limits and establish the reference electrical pulse signal as representing an interval of distance within which the coincidence circuit means is responsive, said adjustable depth of field control circuit means functioning independently of said adjustable object distance selector circuit means, and an object lock circuit means which responds to the object recognition output electrical pulse signal of said coincidence circuit means by adjusting the limits of said reference electrical pulse signal to prevent loss of object recognition.

2. Apparatus as claimed in claim 1 wherein said object lock circuit means responds to a coincidence circuit means output signal by decreasing the preselected object distance and increasing the depth of field to thereby extend the limits of said reference electrical pulse signal during object recognition, the extent to which the reference signal limits are extended being a function of the preselected object distance, the limits of said reference electrical pulse signal returning to the limits established independently by said adjustable object distance selector circuit means and said adjustable depth of field control circuit means in the absence of an object recognition output signal from said coincidence circuit means.

3. Apparatus as claimed in claim 1 including an output control circuit operatively connected to the output of said coincidence circuit means to provide an electrical signal suitable for control and indication purposes.

4. Apparatus as claimed in claim 1 wherein said transmitter circuit means includes a pulse-generating circuit which responds to an AC input voltage signal by generating output pulses relative to the peaks of said AC input voltage signal, and an ultrasonic transducer which responds to said output pulses by transmitting said acoustic beam.

5. Apparatus as claimed in claim 4 wherein said pulse-generating circuit means includes a gate-controlled conduction device and a firing circuit means, the said firing circuit means supplying a firing pulse to said gate-controlled conduction device in relation to the peaks of said AC input voltage signal.

6. Apparatus as claimed in claim 4 including means associated with said ultrasonic transducer for controlling and focusing said acoustic beam.

7. Apparatus as claimed in claim 1 including a pulse discriminator circuit means operatively connected between said receiver circuit means and said coincidence circuit means, said pulse discriminator circuit means controlling the rate of pulse signals supplied to the first input of said coincidence circuit means in relation to the pulse output rate of the transmitter circuit means to prevent erroneous response to multiple reflections of a single acoustic pulse received by said receiver circuit means.

8. Apparatus as claimed in claim 7 wherein said pulse discriminator circuit means includes circuit means for establishing a minimum receiver circuit means output pulse magnitude level to which said pulse discriminator circuit means is responsive.

9. Apparatus as claimed in claim 8 wherein said pulse discriminator circuit includes a monostable circuit and an adjustable circuit means for controlling the switching of said monostable circuit from the unstable state to the stable state, said monostable circuit being switched to the unstable state by a receiver circuit means output pulse, the magnitude of which exceeds the established minimum magnitude level, said adjustable circuit means controlling the period of time during which the monostable circuit is maintained in the unstable state, the switching of said monostable circuit back to the stable state producing a pulse output signal which is applied to the first input of said coincidence circuit means.

10. Apparatus as claimed in claim 1 wherein said object distance selector circuit means includes a monostable circuit and an adjustable circuit means for controlling the switching of said monostable circuit from the unstable state to the stable state, said monostable circuit switched to the unstable state by the occurrence of an output pulse from said transmitter circuit means, the adjustable circuit means maintaining the monostable circuit in the unstable state for a period of time corresponding to a preselected object distance, the switching of the monostable circuit to the stable state resulting in the generation of the reference electrical pulse.

11. Apparatus as claimed in claim 3 further including an output driver circuit operatively connected between the output of the coincidence circuit means and the output control circuit to control the duration of activation of the output control circuit in response to an output signal from the coincidence circuit means.

* * * * *